United States Patent [19]
Navarro

[11] 3,782,268
[45] Jan. 1, 1974

[54] ROTARY ROASTING DEVICE

[76] Inventor: Jorge Roca Navarro, Lauria St. 123, Barcelona, Spain

[22] Filed: Sept. 25, 1972

[21] Appl. No.: 291,557

[52] U.S. Cl. .............................................. 99/421 P
[51] Int. Cl. ............................................ A47j 37/04
[58] Field of Search ...................... 99/421, 419, 420

[56] References Cited
UNITED STATES PATENTS
3,196,776   7/1965   Norton .............................. 99/421 P
FOREIGN PATENTS OR APPLICATIONS
1,093,890   11/1954   France ............................. 99/421 P
1,265,159   5/1961   France ............................. 99/421 P

*Primary Examiner*—Robert W. Jenkins
*Assistant Examiner*—Arthur O. Henderson
*Attorney*—Woodhams, Blanchard & Flynn

[57] ABSTRACT

An improved rotary roasting device for mounting at least one spit, comprising a square section axle, and three substantially parallel plates mounted on said axle, two at one extremity and the third at the other, the first plate being held elastically in parallel against the second plate, the second plate having orifices for receiving the extremity of the spit, and the third plate having square windows with slots opening to the periphery of the plate, and the spit having a handle portion at one end and a triangular enlargement with a backing stop adjacent the handle portion, the triangular enlargement being positionable in said square window.

2 Claims, 6 Drawing Figures

Fig. 1
Fig. 4
Fig. 5
Fig. 6
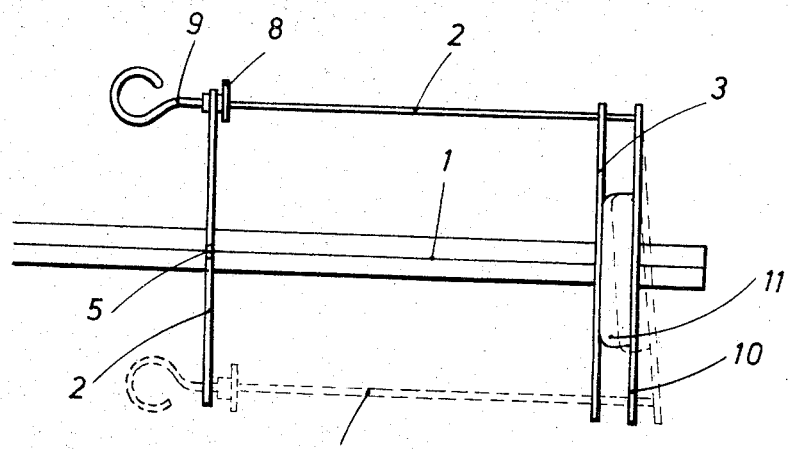
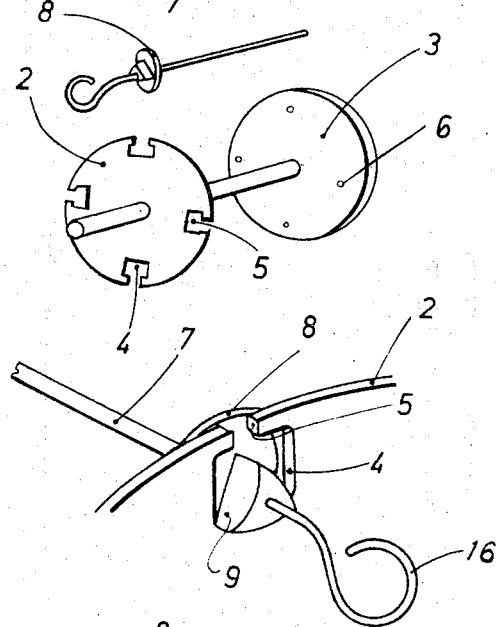
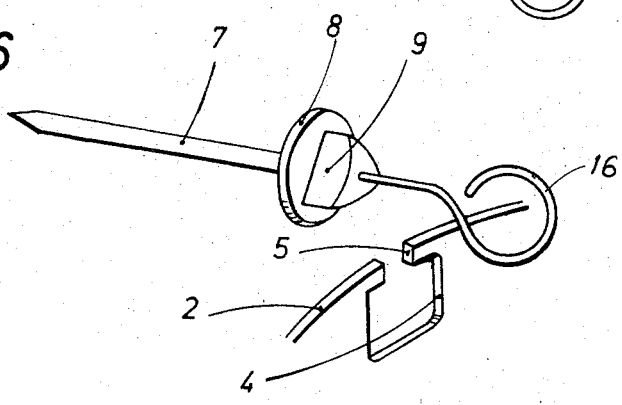

ROTARY ROASTING DEVICE

This invention refers to an improved rotary roasting device.

The invention consists essentially of an apparatus that is coupled to and onto the main shaft or lance of a roaster so as to acquire its rotary movement, said apparatus presenting adequate supports for the pinchers or clasps that hold the small pieces of aliments to be roasted (meat, bacon, sausage, etc.) The pinchers are mounted free in their respective supports and rotate as satellites around the main shaft, thus permitting the total and regular roasting of the satellites. The apparatus includes a pincher blocking device that prevents the pinchers from falling from the supports, but does not impede their automatic gyration.

Referring to the figures:

FIG. 1 shows a side view in elevation of the device as a whole;

FIG. 4 is a perspective view of the device;

FIG. 5 is an enlarged perspective view of a portion of FIG. 4; and

FIG. 6 is a view similar to FIG. 5 but showing the parts in a disassembled condition.

Figure 2:
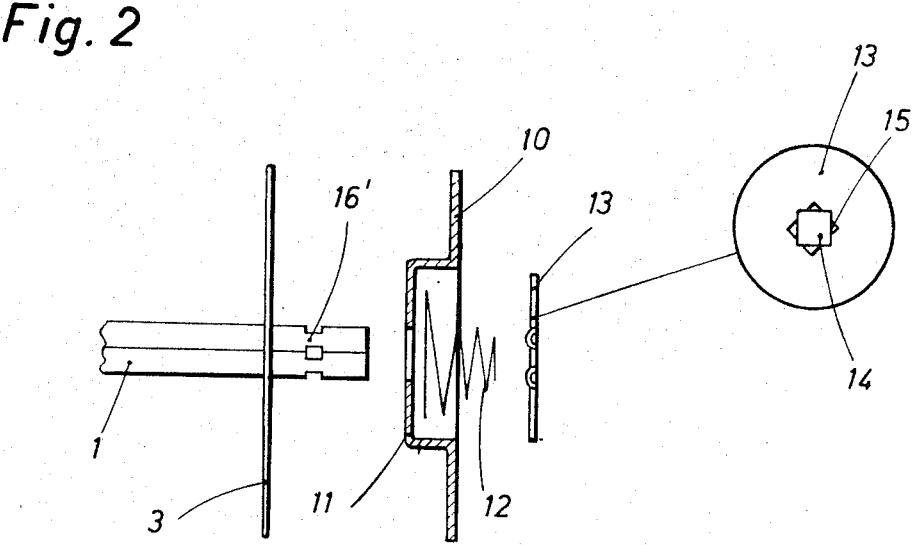
FIG. 2 shows a disassembled view of the rocker plate support.

Referring to the drawings, the roaster includes a support or main shaft 1 having a tubular square cross section. Shaft 1 supports thereon a pair of spaced support plates 2 and 3. The plate 2 has a plurality of circumferentially spaced windows or openings 4 formed therein, which openings are substantially square. Further, each of the openings communicates with the periphery of the plate 2 by means of a radially extending slot 5. The other support plate 3 has a plurality of small openings or orifices 6 formed therein, which openings 6 extend through the plate 3 and are substantially aligned with the large window-like openings 4 formed in the plate 2.

The support plates 2 and 3 are designed to support thereon one or more elongated pinchers or spits 7 which are pointed at one end and are provided with a curved handle portion 16 at the other end. The spit is provided with an enlarged disc 8 fixedly secured thereto adjacent the handle portion, which disc 8 is larger than the opening 4. Further, a triangular portion 9 is fixedly secured directly adjacent the disc 8 and is provided with convex curved outer surfaces. When the spit is supported on the support plates 2 and 3, the pointed end of the spit is adapted to extend through the orifice 6 formed in the plate 3, whereas the disc 8 is adapted to be positioned between the plates directly adjacent the plate 2, whereupon the triangular portion 9 is then positioned within the opening 4.

Accordingly, when the roaster is rotated, due to rotation of the main support shaft 1, the spit 7 will likewise rotate or gyrate about its own longitudinal axis due to the play or clearance which exists between the triangle 9 and the square opening 4, the triangle 9 enabling the spit to rotate about its own axis relative to the support plates 2 and 3 in a steplike or incremental manner.

As indicated above, the disc 8 serves as a stop to prevent the axial displacement of the spit 7 in one direction, namely in the leftward direction in FIG. 1. A further plate 10 which is disposed adjacent to and outwardly from the support plate 3 is provided to prevent displacement of the spits 7 in the opposite direction. For this purpose, the plate 10 is provided with a central cuplike flange 11 which acts as a spacing device for maintaining the plate 10 spaced a predetermined distance from and substantially parallel with the plate 3.

Figure 3:
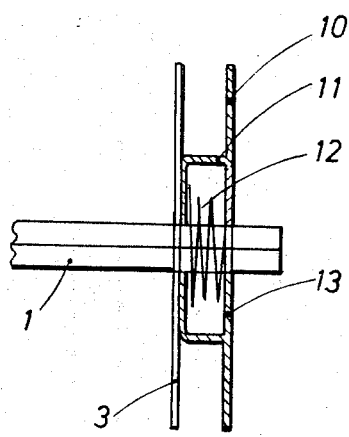
FIG. 3 shows the structure of FIG. 2 in assembled condition.

The plate 10 is positioned on the shaft 1 so that the central flange 11 thereof is disposed in abutting engagement with the plate 3. A spring 12 is positioned within the cuplike central flange 11 and positioned in surrounding relationship to the shaft 1 so that one end of the spring urges the central flange 11 against the plate 3. The other end of the spring 12 is retained in position by means of a removable retaining washer 13 which is fixedly but removably positioned on the end of the shaft 1. The washer 13 is provided with a square orifice 14 to slidably accommodate the cross section of the shaft 1. The washer is also provided with slots 15 between the vertices of the square orifice 14 for enabling the washer to be locked into position within the grooves 16' provided adjacent the end of the shaft 1, thereby axially retaining the washer 13 in the position illustrated in FIG. 3.

When the spit 7 is to be removed from the roaster, then the spit is pushed axially (rightwardly in FIG. 1) so as to cause the plate 10 to assume an inclined position as illustrated by dotted lines in FIG. 1. This causes the triangle 9 to be removed from the opening 4, whereupon the spit can be angularly inclined outwardly with the handle portion 16 of the spit passing through the radial recess 5. The pointed end portion of the spit can then be slidably removed from the support plate 3, thereby enabling complete removal of the spit from the roaster. The insertion or mounting of the spit on the roaster obviously occurs in the opposite manner as described above. After the spit has been totally removed, then the spring 12 will again resiliently urge the plate 10 back into its normal position in parallel relationship with the plate 3.

The embodiments of the invention in which an exclusive property or privilege is claimed are defined as follows:

1. An improved rotary roasting device for mounting at least one spit, comprising a square section axle, and three substantially parallel plates mounted on said axle, two at one extremity and the third at the other, the first plate being held elastically in parallel against the second plate, the second plate having orifices for receiving the extremity of the spit, and the third plate having square windows with slots opening to the periphery of the plate, and the spit having a handle portion at one end and a triangular enlargement with a backing stop adjacent the handle portion, the triangular enlargement being positionable in said square window.

2. A device according to claim 1, wherein the first plate has a flange where a spring is housed supported at the extremity of the square axle, being held against the plate by means of a retaining washer with a square orifice with spaces between the vertices that are anchored in slots adequately provided at the extremity of the square axle.

* * * * *